(12) United States Patent
Saito

(10) Patent No.: US 9,378,537 B2
(45) Date of Patent: Jun. 28, 2016

(54) CONTROL DEVICE

(71) Applicant: BROTHER KOGYO KABUSHIKI KAISHA, Nagoya-shi, Aichi-ken (JP)

(72) Inventor: Ken Saito, Tokoname (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/757,341

(22) Filed: Feb. 1, 2013

(65) Prior Publication Data

US 2013/0202222 A1 Aug. 8, 2013

(30) Foreign Application Priority Data

Feb. 3, 2012 (JP) ................. 2012-022116

(51) Int. Cl.
| | |
|---|---|
| *G06K 9/54* | (2006.01) |
| *G06K 9/60* | (2006.01) |
| *G06T 1/60* | (2006.01) |
| *G06F 3/12* | (2006.01) |

(52) U.S. Cl.
CPC ................ *G06T 1/60* (2013.01); *G06F 3/1206* (2013.01); *G06F 3/1247* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 8,578,261 B1 * | 11/2013 | Gupta et al. | 715/208 |
| 9,001,366 B2 * | 4/2015 | Sasaki | 358/1.15 |
| 2002/0026500 A1 | 2/2002 | Kanefsky et al. | |
| 2002/0175841 A1 * | 11/2002 | Koike | 341/55 |
| 2003/0053118 A1 | 3/2003 | Muramoto et al. | |
| 2004/0172376 A1 * | 9/2004 | Kobori et al. | 707/1 |
| 2005/0235077 A1 | 10/2005 | Kubota | |
| 2006/0072721 A1 | 4/2006 | Wisniewski | |
| 2006/0179413 A1 | 8/2006 | Eifler et al. | |

(Continued)

FOREIGN PATENT DOCUMENTS

| | | |
|---|---|---|
| JP | 2002-073466 A | 3/2002 |
| JP | 2003-91393 A | 3/2003 |

(Continued)

OTHER PUBLICATIONS

Japan Patent Office, Office Action for Japanese Patent Application No. 2011-074582, mailed Mar. 26, 2013.

(Continued)

*Primary Examiner* — Andrae S Allison
(74) *Attorney, Agent, or Firm* — Merchant & Gould P.C.

(57) ABSTRACT

A control device includes: a first acquisition unit which, when a specific data storage server is selected, acquires specific server identification information; a second acquisition unit which, upon acquiring the specific server identification information, acquires specific file type information of specific data from the specific data storage server; a determination unit which determines whether the specific data has an interpretable format, based on the specific server identification information and the specific file type information; a conversion processing execution unit which, when the specific data does not have the interpretable format, causes a specific conversion server to convert the specific data to data having the interpretable format; and an output processing execution unit which causes an image output apparatus to output a specific image expressed by the specific data without causing the specific conversion server to execute the conversion when the specific data is determined to have the interpretable format.

14 Claims, 6 Drawing Sheets

(56) References Cited

U.S. PATENT DOCUMENTS

| | | |
|---|---|---|
| 2007/0112938 A1 | 5/2007 | Belimpasakis |
| 2007/0124781 A1* | 5/2007 | Casey et al. .................. 725/94 |
| 2007/0223051 A1 | 9/2007 | Henry et al. |
| 2008/0082677 A1* | 4/2008 | Miyazawa et al. ............ 709/229 |
| 2008/0137126 A1 | 6/2008 | Yoshida |
| 2008/0320173 A9 | 12/2008 | Matsushima et al. |
| 2009/0024626 A1* | 1/2009 | Takei .................................. 707/9 |
| 2012/0081743 A1 | 4/2012 | Watanabe et al. |
| 2012/0084402 A1* | 4/2012 | Ito et al. ........................... 709/219 |
| 2012/0254368 A1* | 10/2012 | Sasaki et al. .................... 709/219 |
| 2013/0202222 A1 | 8/2013 | Saito |
| 2013/0287371 A1* | 10/2013 | Choi et al. ....................... 386/353 |
| 2014/0185087 A1* | 7/2014 | Hayashi ........................... 358/1.15 |

FOREIGN PATENT DOCUMENTS

| | | |
|---|---|---|
| JP | 2003-216390 A | 7/2003 |
| JP | 2005-235035 A | 9/2005 |
| JP | 2005-269250 A | 9/2005 |
| JP | 2005-292903 A | 10/2005 |
| JP | 2006-260009 A | 9/2006 |
| JP | 2006-260335 A | 9/2006 |
| JP | 2007-55051 A | 3/2007 |
| JP | 2008-152660 A | 7/2008 |
| JP | 2009-145974 A | 7/2009 |
| JP | 2012-209802 A | 10/2012 |

OTHER PUBLICATIONS

U.S. Office Action issued in related U.S. Appl. No. 13/363,294, mailed Jan. 12, 2015.

U.S. Patent and Trademark Office, Office Action for U.S. Appl. No. 13/363,294, mailed Jul. 12, 2013.

U.S. Office Action issued in related U.S. Appl. No. 13/363,294, mailed Jul. 6, 2015.

Office Action issued in corresponding Japanese Application No. 2012-022116, mailed Dec. 1, 2015.

U.S. Office Action issued in related U.S. Appl. No. 13/363,294, mailed Jan. 21, 2016.

Notification of Reason for Refusal issued in in related Japanese Application No. 2012-124821, Jan. 26, 2016.

* cited by examiner

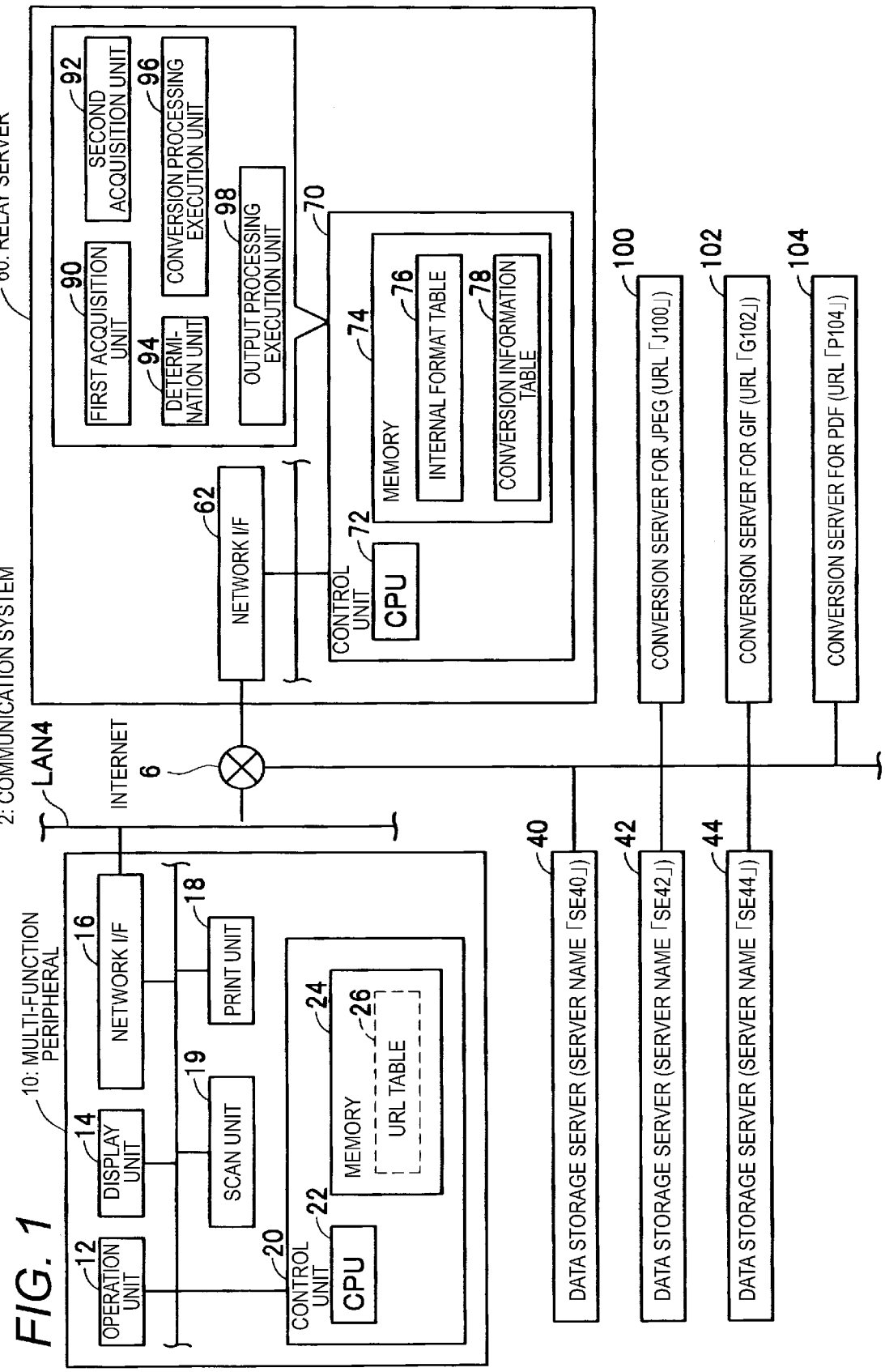

FIG. 2

76 INTERNAL FORMAT TABLE

| SERVERNAME | FILE TYPE | OUTPUT METHOD | FILE INTERNAL FORMAT |
|---|---|---|---|
| SE40 | JPEG | THUMBNAIL DISPLAY | BASELINE JPEG |
| SE40 | JPEG | PRINT | BASELINE JPEG |
| SE40 | GIF | THUMBNAIL DISPLAY | BASELINE GIF |
| SE40 | GIF | PRINT | BASELINE GIF |
| SE42 | JPEG | THUMBNAIL DISPLAY | PROGRESSIVE JPEG |
| SE42 | JPEG | PRINT | PROGRESSIVE JPEG |
| SE42 | GIF | THUMBNAIL DISPLAY | INTERLACE GIF |
| SE42 | GIF | PRINT | INTERLACE GIF |
| SE44 | JPEG | THUMBNAIL DISPLAY | PROGRESSIVE JPEG |
| SE44 | JPEG | PRINT | BASELINE JPEG |

FIG. 3

78 CONVERSION INFORMATION TABLE

| FILE INTERNAL FORMAT | CONVERSION NECESSITY | CONVERSION METHOD | CONVERSION SERVER URL |
|---|---|---|---|
| BASELINE JPEG | UNNECESSARY | — | — |
| PROGRESSIVE JPEG | NECESSARY | DATA ACQUISITION → CONVERSION INSTRUCTION | J100 |
| BASELINE GIF | UNNECESSARY | — | — |
| INTERLACE GIF | NECESSARY | CONVERSION INSTRUCTION | G102 |

FIG. 4

(SECOND EXEMPLARY EMBODIMENT)

26 URL TABLE

| FILE TYPE | CONVERSION METHOD | CONVERSION SERVER URL |
|---|---|---|
| JPEG | DATA ACQUISITION → CONVERSION INSTRUCTION | J100 |
| GIF | CONVERSION INSTRUCTION | G102 |

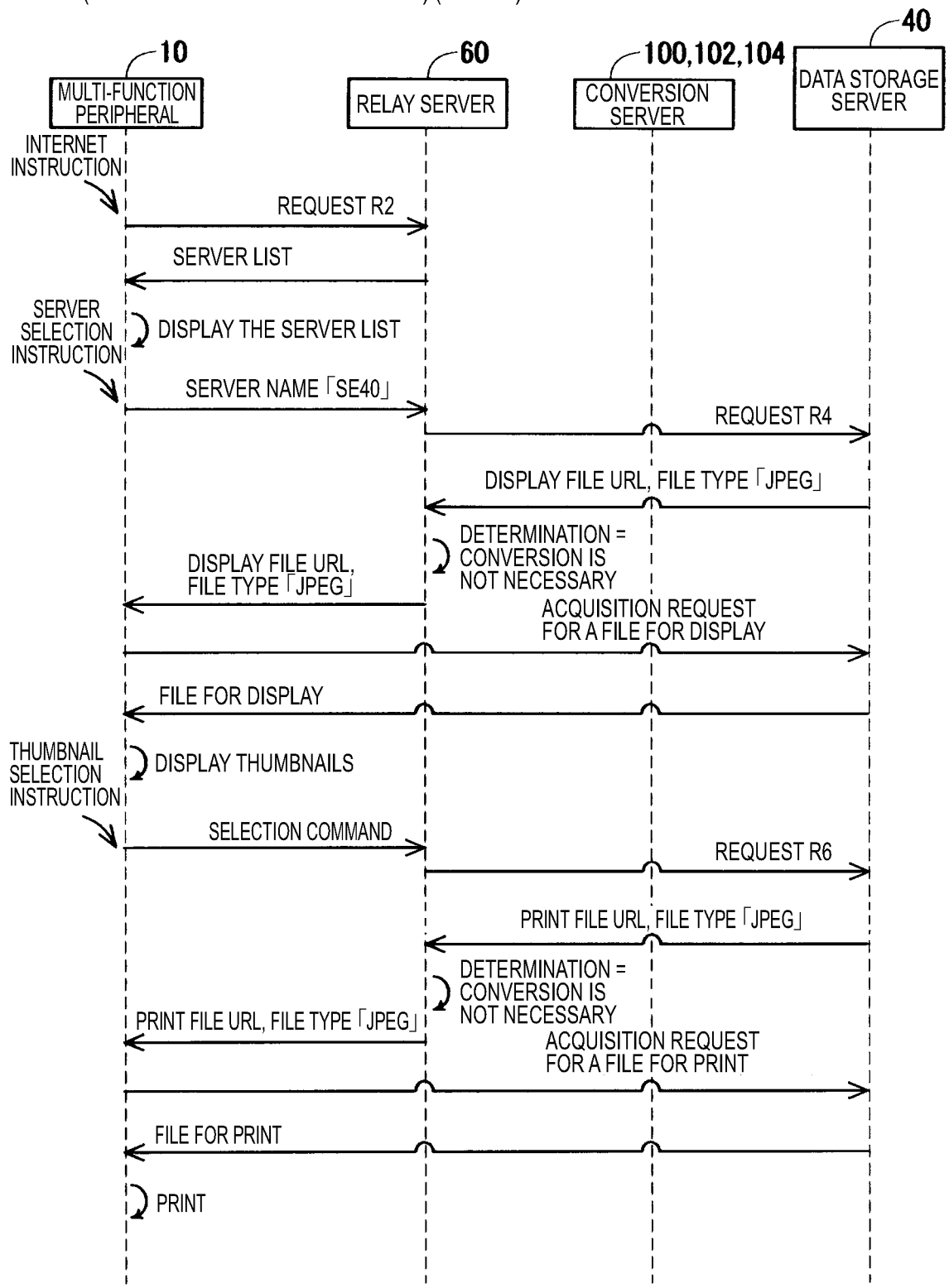

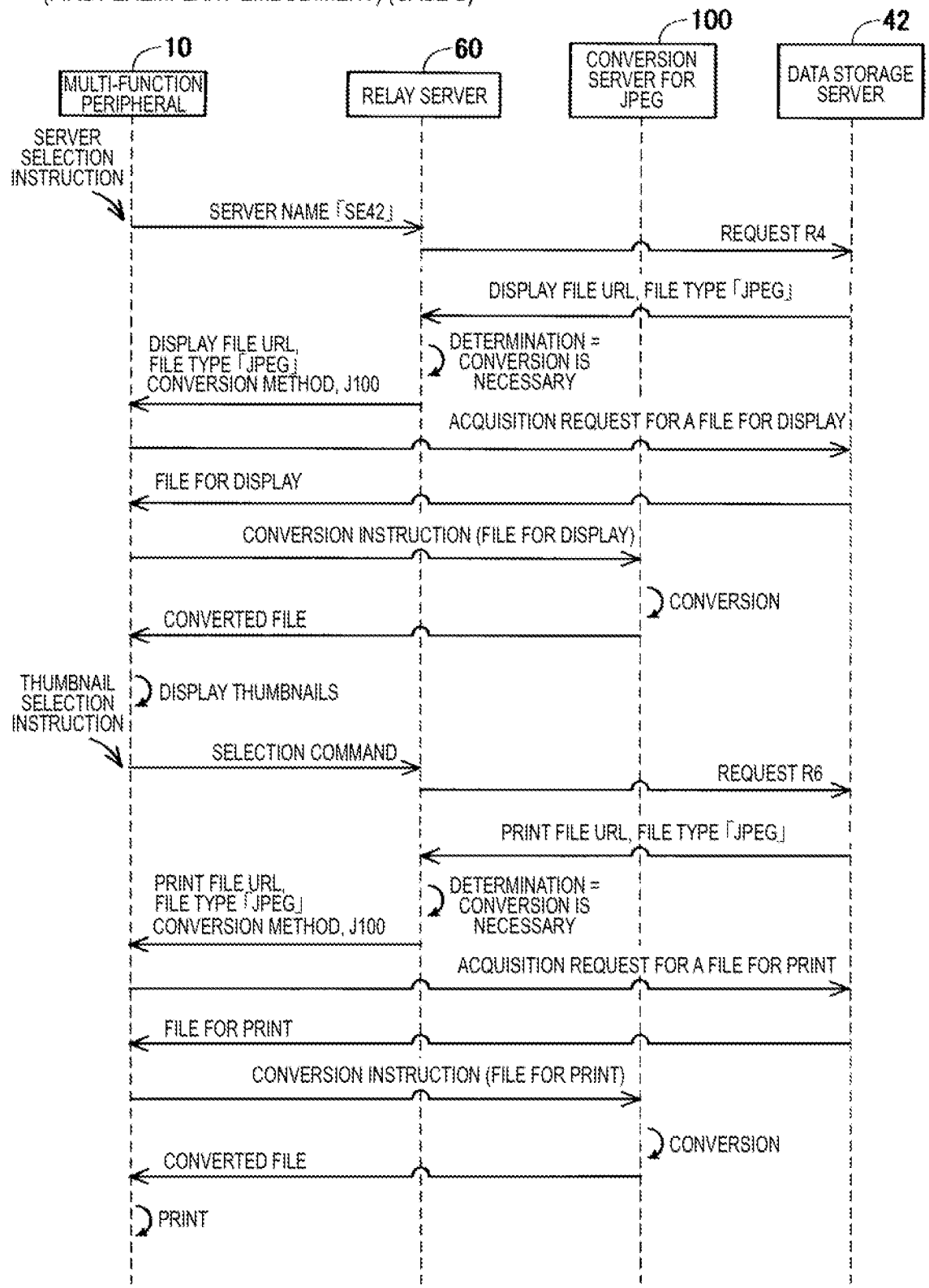

(FIRST EXEMPLARY EMBODIMENT) (CASE C)

(FIRST EXEMPLARY EMBODIMENT) (CASE D)

CONTROL DEVICE

CROSS-REFERENCE TO RELATED APPLICATIONS

This application claims priority from Japanese Patent Application No. 2012-022116 filed on Feb. 3, 2012, the entire subject matter of which is incorporated herein by reference.

TECHNICAL FIELD

The invention relates to a control device for an image output apparatus configured to output an image.

BACKGROUND

For example, there have been disclosed an MFP that refers to an extension of a file name of a received attached file and determines whether the attached file has a format that can be printed by the MFP. When the attached file does not have a format that can be printed by the MFP, the MFP requests a server to convert the attached file.

SUMMARY

Illustrative aspects of the invention provide a technology for appropriately determining whether specific data has a format that can be interpreted by an image output apparatus.

According to one illustrative aspect of the invention, there is provided a control device for an image output apparatus that is configured to output an image. The control device includes a first acquisition unit, a second acquisition unit, a determination unit, a conversion processing execution unit, and an output processing execution unit. The first acquisition unit is configured to, when a specific data storage server from a plurality of data storage servers is selected by a user, acquire specific server identification information for identifying the specific data storage server. The second acquisition unit is configured to, when the specific server identification information is acquired, acquire specific file type information indicating a file type of specific data, which is stored in the specific data storage server, from the specific data storage server. The determination unit is configured to determine whether the specific data has an interpretable format that can be interpreted by the image output apparatus, based on the specific server identification information and the specific file type information. The conversion processing execution unit is configured to, when it is determined that the specific data does not have the interpretable format, execute conversion processing for causing a specific conversion server to execute data conversion processing of converting the specific data to converted data, the converted data having the interpretable format. The output processing execution unit is configured to execute output processing for causing the image output apparatus to output a specific image that is expressed by the specific data, the output processing execution unit being configured to execute the output processing without causing the specific conversion server to execute the data conversion processing when it is determined that the specific data has the interpretable format.

BRIEF DESCRIPTION OF THE DRAWINGS

FIG. 1 shows a configuration of a communication system;
FIG. 2 shows an example of an internal format table;
FIG. 3 shows an example of a conversion information table;
FIG. 4 shows an example of a URL table;
FIG. 5 shows a sequence diagram of a case A where data conversion is not necessary;
FIG. 6 shows a sequence diagram of a case B where data conversion is necessary.

DETAILED DESCRIPTION

<General Overview>

Figure 7:
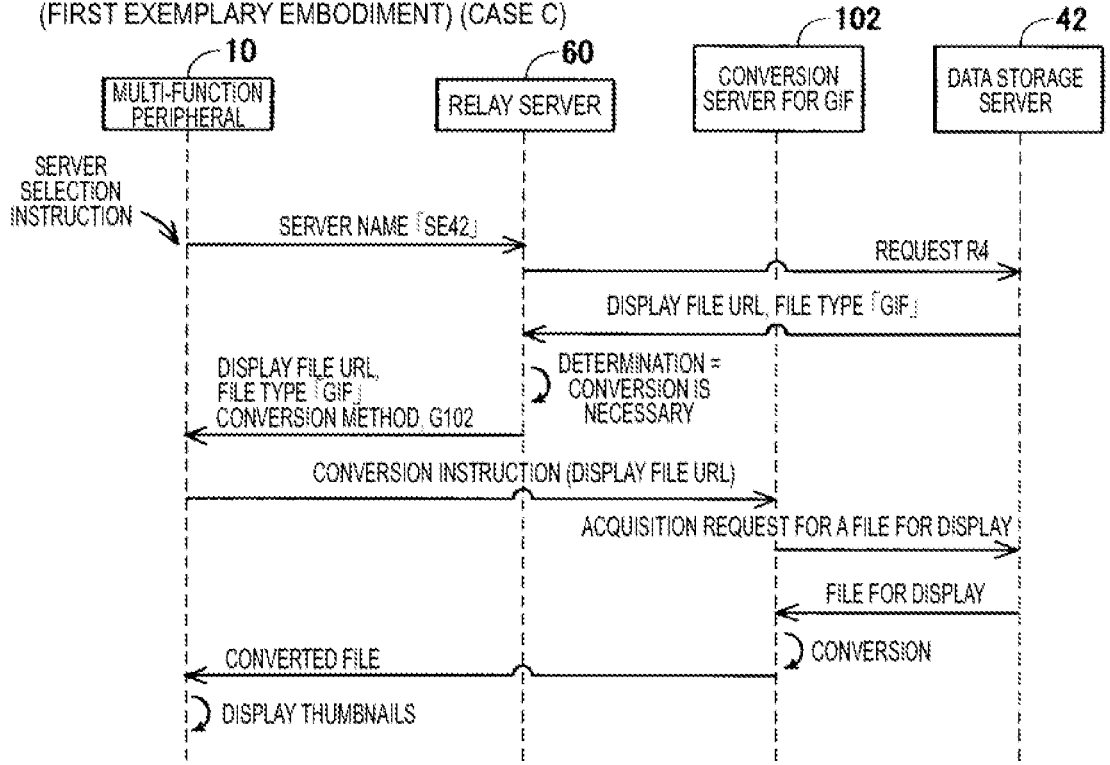
FIG. 7 shows a sequence diagram of a case C where data conversion is necessary.

In the above-described related-art technology, the MFP determines whether the attached file has a format that can be printed by the MFP by referring to only the extension of the file name of the attached file. However, even when only the extension of the file name of the attached file is referred to, it may not possible to execute the appropriate determination.

Therefore, illustrative aspects of the invention provide a technology for appropriately determining whether specific data has a format that can be interpreted by an image output apparatus.

According to a first illustrative aspect of the invention, there is provided a control device for an image output apparatus that is configured to output an image. The control device comprises a first acquisition unit, a second acquisition unit, a determination unit, a conversion processing execution unit, and an output processing execution unit. The first acquisition unit is configured to, when a specific data storage server from a plurality of data storage servers is selected by a user, acquire specific server identification information for identifying the specific data storage server. The second acquisition unit is configured to, when the specific server identification information is acquired, acquire specific file type information indicating a file type of specific data, which is stored in the specific data storage server, from the specific data storage server. The determination unit is configured to determine whether the specific data has an interpretable format that can be interpreted by the image output apparatus, based on the specific server identification information and the specific file type information. The conversion processing execution unit is configured to, when it is determined that the specific data does not have the interpretable format, execute conversion processing for causing a specific conversion server to execute data conversion processing of converting the specific data to converted data, the converted data having the interpretable format. The output processing execution unit is configured to execute output processing for causing the image output apparatus to output a specific image that is expressed by the specific data, the output processing execution unit being configured to execute the output processing without causing the specific conversion server to execute the data conversion processing when it is determined that the specific data has the interpretable format.

According to the above configuration, the control device determines whether the specific data has a format (interpretable format) that can be interpreted by the image output apparatus, based on the specific server identification information and the specific file type information. That is, the control device uses not only the specific file type information but also the specific server identification information, as the information for determining whether the data conversion is necessary. Therefore, the control device can appropriately determine whether the data conversion is necessary. Hence, the control device can appropriately execute the processing (e.g., conversion processing or output processing) depending on the determination result.

According to a second illustrative aspect of the invention, the image output apparatus comprises a display unit configured to display an image and a print unit configured to print an image. The determination unit is configured to determine whether the specific data has the interpretable format, further based on whether the specific data is data that is to be displayed by the display unit or whether the specific data is data that is to be printed by the display unit.

According to this configuration, the control device further uses the output method of the specific data (e.g., whether the data is data that is to be displayed on the display unit or data that is to be printed by the print unit), as the information for determining whether the data conversion is necessary. Therefore, the control device can further appropriately determine whether the data conversion is necessary.

According to a third illustrative aspect of the invention, the control device is a control server configured to communicate with the image output apparatus via a network. The conversion processing execution unit is configured to execute the conversion processing comprising transmitting specific location information, which indicates a location of the specific conversion server on the network, to the image output apparatus.

According to this configuration, when the control device executes the conversion processing, the image output apparatus can enable the specific conversion server to appropriately execute the data conversion by using the specific location information.

According to a fourth illustrative aspect of the invention, the conversion processing execution unit is configured to execute the conversion processing such that the specific conversion server acquires the specific data from the specific data storage server without via the image output apparatus and executes the data conversion processing of converting the acquired specific data to the converted data.

According to this configuration, when the control device executes the conversion processing, the data conversion can be appropriately executed.

According to a fifth illustrative aspect of the invention, the conversion processing execution unit is configured to execute the conversion processing such that the image output apparatus acquires the specific data from the specific data storage server and supplies the specific data to the conversion server.

According to this configuration, when the control device executes the conversion processing, the data conversion can be appropriately executed.

According to a sixth illustrative aspect of the invention, the control device is a control server configured to communicate with the image output apparatus via a network. The conversion processing execution unit is configured to execute the conversion processing comprising transmitting method relation information to the image output apparatus. The method relation information is information relating to any one of: a first method where the specific conversion server acquires the specific data from the specific data storage server without via the image output apparatus; and a second method where the image output apparatus acquires the specific data from the specific data storage server and supplies the specific data to the conversion server.

According to this configuration, when the control device executes the conversion processing, the image output apparatus can enable the specific conversion server to appropriately execute the data conversion by using the specific location information.

According to a seventh illustrative aspect of the invention, the control device is a control server configured to communicate with the image output apparatus via a network. The image output apparatus is configured to store a location information table in which a file type and location information indicating a location of a conversion server executing conversion of data having the file type on the network are associated with one another. The conversion processing execution unit is configured to execute the conversion processing comprising transmitting information indicating that the data conversion processing is necessary and the specific file type information to the image output apparatus such that the image output apparatus causes the specific conversion server to execute the data conversion processing by using specific location information associated with the specific file type information in the location information table.

According to this configuration, when the control device executes the conversion processing, the image output apparatus can enable the specific conversion server to appropriately execute the data conversion by using the specific location information.

According to an eighth illustrative aspect of the invention, the control device further comprises a memory configured to store a format relation information table, in which server identification information, a file type and format relation information are associated with one another, the format relation information being information relating to whether data having the file type, which is stored in the data storage server identified by the server identification information, has the interpretable format. The determination unit is configured to refer to the format relation information table and to determine whether the specific data has the interpretable format based on the specific server identification information and the specific file type information.

According to this configuration, the control device can appropriately determine whether the data conversion is necessary by referring to the format relation information table.

According to a ninth illustrative aspect of the invention, when it is determined that the specific data does not have the interpretable format, the conversion processing execution unit is configured to execute the conversion processing for causing the specific conversion server to execute the data conversion processing of converting the specific data to the converted data, and the output processing execution unit is configured to execute the output processing for causing the image output apparatus to output the specific image on the basis of the converted data.

A control method for implementing the above control device, a computer program and a computer-readable recording medium storing therein the computer program are also novel and useful.

<Exemplary Embodiments>

Exemplary embodiments of the invention will now be described with reference to the drawings.

(First Exemplary Embodiment)

(Configuration of System)

As shown in FIG. 1, a communication system 2 includes a multi-function peripheral 10, a plurality of data storage servers 40, 42, 44, a relay server 60 and a plurality of conversion servers 100, 102, 104. The multi-function peripheral 10 is connected to a LAN 4. The relay server 60 and the respective servers 40, 42, 44 and 100, 102, 104 are connected to the Internet 6. Therefore, the relay server 60 is connected in communication with the multi-function peripheral 10 via the LAN 4 and the Internet 6.

(Configuration of Multi-Function Peripheral 10)

The multi-function peripheral 10 is configured to execute multi-functions such as print, scan, copy and FAX functions. The multi-function peripheral 10 includes an operation unit 12, a display unit 14, a network interface 16, a print unit 18, a scan unit 19 and a control unit 20. The operation unit 12 includes a plurality of keys. A user can input a variety of instructions into the multi-function peripheral 10 by operating the operation unit 12. The display unit 14 is configured to display a variety of information. The network interface 16 is connected to the LAN 4. The print unit 18 includes a print mechanism such as inkjet and laser methods and the like. The scan unit 19 includes a scan mechanism such as CCD, CIS and the like.

The control unit 20 includes a CPU 22 and a memory 24. The CPU 22 is configured to execute a variety of processing in response to programs stored in the memory 24. Incidentally, a URL table 26 in the memory 24 is used in a second exemplary embodiment that will be described later.

(Configuration of Data Storage Servers 40, 42, 44)

The data storage servers 40, 42, 44 have server names 'SE40', 'SE42' and 'SE44', respectively. The data storage servers 40, 42, 44 are configured to store data that is acquired from a communication device (for example, multi-function peripheral 10, PC and the like) and to provide the stored data to the communication device. That is, the data storage servers 40, 42, 44 are configured to provide a data upload service and a data download service to the communication device. The data storage servers 40, 42, 44 are not servers that are provided by a vendor of the multi-function peripheral 10. The data storage servers 40, 42, 44 may be well-known servers such as 'Evernote (registered trademark)', 'Google (registered trademark) Docs', 'Picasa (registered trademark)' and 'facebook (registered trademark)', for example.

For example, the data storage server 40 is provided by a first business operator, and the data storage server 42 is provided by a second business operator that is different from the first business operator. The first business operator discloses a first API (Application Program Interface) for receiving a service from the data storage server 40, and the second business operator discloses a second API for receiving a service from the data storage server 42. Typically, the first API and the second API are different from each other. A communication device is required to correspond to both the first and second APIs so as to receive the services from the respective data storage servers 40, 42 (e.g., both a program for using the first API and a program for using the second API are required).

In order for the multi-function peripheral 10 to receive the services from the respective data storage servers 40, 42, 44, the multi-function peripheral 10 is required to correspond to a plurality of APIs and to store therein a plurality of programs. However, compared to a PC and the like, a storage capacity of the memory of the multi-function peripheral 10 is smaller. Therefore, in this exemplary embodiment, the relay server 60 is provided so that the multi-function peripheral 10 can receive the services from the respective data storage servers 40, 42, 44 without storing many programs in the multi-function peripheral 10. That is, the relay server 60 corresponds to a plurality of APIs for the plurality of data storage servers 40, 42, 44. In a situation where the multi-function peripheral 10 is to receive the service from a specific data storage server (for example, data storage server 40) of the plurality of data storage servers 40, 42, 44, the relay server 60 uses an API for the specific data storage server to perform a variety of communications (for example, communications of respective requests R4, R6 and the like shown in FIG. 5) (which will be described later) with the specific data storage server. Thereby, even though the multi-function peripheral 10 does not correspond to the API for the specific data storage server, the multi-function peripherals 10 can receive the service from the specific data storage server.

(Configuration of Relay Server 60)

The relay server 60 is a server that is independently provided from the multi-function peripheral 10 and the respective data storage servers 40, 42, 44. The relay server 60 is a server for relaying provision of data from the respective data storage servers 40, 42, 44 to the multi-function peripheral 10. The relay server 60 is a server that is provided by the vendor of the multi-function peripheral 10. The relay server 60 includes a network interface 62 and a control unit 70. The control unit 70 includes a CPU 72 and a memory 74. The CPU 72 is configured to execute a variety of processing in response to programs stored in the memory 74. The CPU 72 is configured to execute the processing in response to the programs so as to implement functions of respective units 90 to 98. Incidentally, the memory 74 stores therein an internal format table 76 and a conversion information table 78, in addition to the programs. Contents of the respective tables 76, 78 will be specifically described later.

(Configuration of Conversion Servers 100, 102, 104)

The conversion servers 100, 102, 104 are allotted with URLs 'J100', 'G102' and 'P104' indicating locations on the Internet 6, respectively. The conversion servers 100, 102, 104 are servers for converting data having a format that is unable to be interpreted by the multi-function peripheral 10 into data having a format that can be interpreted by the multi-function peripheral 10. The conversion servers 100, 102, 104 are servers that are provided by the vendor of the multi-function peripheral 10.

In this exemplary embodiment, the multi-function peripheral 10 can interpret (e.g., can display or print) a JPEG (Joint Photographic Experts Group) file having an internal format 'baseline JPEG,' but is unable to interpret a JPEG file having an internal format 'progressive JPEG.' The progressive JPEG is an internal format that enables a progressive (gradual) display from an unclear image to a clear image as a file thereof is downloaded. Incidentally, the baseline JPEG is a typical internal format, not a special internal format such as progressive JPEG. That is, the baseline JPEG is an internal format that an image thereof is unable to be displayed unless a file thereof is completely downloaded. The conversion server 100 for JPEG is a server for converting a JPEG file having the internal format 'progressive JPEG' into a file having a format (hereinafter, referred to as 'target format') that can be interpreted by the multi-function peripheral 10.

Further, the multi-function peripheral 10 can interpret a GIF (Graphic Interchange Format) file having an internal format 'baseline GIF' but is unable to interpret a GIF file having an internal format 'interlace GIF'. The interlace GIF is an internal format that enables a progressive (gradual) display from an unclear image to a clear image as a file thereof is downloaded, like the progressive JPEG. Incidentally, the baseline GIF is a typical internal format. The conversion server 102 for GIF is a server for converting a GIF file having the internal format 'interlace GIF' into a file having the target format.

The multi-function peripheral 10 is unable to interpret a PDF (Portable Document Format) file, irrespective of an internal format of the PDF file. The conversion server 104 for PDF is a server for converting a PDF file into a file having the target format.

(Contents of Internal Format Table 76: FIG. 2)

As shown in FIG. 2, the internal format table 76 is a table in which a server name, a file type, an output method and a file internal format are associated with one another. The server name indicates the server name 'SE40' and the like of the data storage servers 40, 42, 44.

The file type indicates 'JPEG', 'GIF' and the like. The output method indicates a method of outputting a file (e.g., whether a file is used for a thumbnail display or print). The file internal format indicates 'baseline JPEG', 'progressive JPEG' and the like.

For example, in the internal format table 76, information of a first line ('SE40', 'JPEG', 'thumbnail display' and 'baseline JPEG') and information of a second line ('SE40', 'JPEG', 'print' and 'baseline JPEG') mean following information. That is, the information of the first line means that when the data storage server 40 is to store a JPEG file in response to an upload request from a communication device, the data storage server 40 stores a JPEG file having the internal format 'baseline JPEG' as a JPEG file to be used for thumbnail display (hereinafter, referred to as 'JPEG file for display'). The information of the second line means that when the data storage server 40 is requested to store a JPEG file in response to an upload request from a communication device, the data storage server 40 stores a JPEG file having the internal format 'baseline JPEG' as a JPEG file to be used for print (hereinafter, referred to as 'JPEG file for print').

Likewise, information of a third line means that when the data storage server 40 is requested to store a GIF file in response to an upload request from a communication device, the data storage server 40 stores a GIF file having the internal format 'baseline GIF' as a GIF file to be used for thumbnail display (hereinafter, referred to as 'GIF file for display'). The information of a fourth line means that when the data storage server 40 is requested to store a GIF file in response to an upload request from a communication device, the data storage server 40 stores a GIF file having the internal format 'baseline GIF' as a GIF file to be used for print (hereinafter, referred to as 'GIF file for print'). That is, the data storage server 40 stores a JPEG file and a GIF file (e.g., a JPEG file and a GIF file for which it is not required to perform data conversion) that can be interpreted by the multi-function peripheral 10.

Further, information of fifth and sixth lines means that the data storage server 42 stores a JPEG file having the internal format 'progressive JPEG' as a JPEG file for display and a JPEG file for print, respectively, and information of seventh and eighth lines means that the data storage server 42 stores a GIF file having the internal format 'interlace GIF' as a GIF file for display and a GIF file for print, respectively. That is, the data storage server 42 stores a JPEG file and a GIF file (e.g., a JPEG file and a GIF file for which it is required to perform data conversion) that are unable to be interpreted by the multi-function peripheral 10.

Further, information of a ninth line means that the data storage server 44 stores a JPEG file having the internal format 'progressive JPEG' as a JPEG file for display, and information of a tenth line means that the data storage server 44 stores a JPEG file having the internal format 'baseline JPEG' as a JPEG file for print. That is, the data storage server 44 stores both a JPEG file that can be interpreted by the multi-function peripheral 10 and a JPEG file that is unable to be interpreted by the multi-function peripheral 10. Incidentally, the data storage server 44 is unable to store a GIF file. Therefore, the information of a GIF file relating to the data storage server 44 is not described in the internal format table 76.

(Contents of Conversion Information Table 78: FIG. 3)

As shown in FIG. 3, the conversion information table 78 is a table in which a file internal format, a conversion necessity, a conversion method and a conversion server URL are associated with one another. The file internal format indicates 'baseline JPEG', 'progressive JPEG' and the like. The conversion necessity indicates whether data conversion is necessary or not. The conversion method indicates whether the multi-function peripheral 10 acquires a target file of the data conversion from the data storage server and provides the target data to the conversion server ('data acquisition→conversion instruction') or the conversion server acquires a target file of the data conversion from the data storage server without via the multi-function peripheral 10 ('conversion instruction'). The conversion server URL indicates the URLs 'J100' and 'G102' of the conversion servers 100, 102.

As described above, the multi-function peripheral 10 can interpret a JPEG file having the internal format 'baseline JPEG' and a GIF file having the internal format 'baseline GIF.' Accordingly, the 'baseline JPEG' and the 'baseline 'GIF' are associated with 'unnecessary' as the conversion necessity.

On the other hand, the multi-function peripheral 10 is unable to interpret a JPEG file having the internal format 'progressive JPEG.' Therefore, the 'progressive JPEG' is associated with 'necessary' as the conversion necessity and the conversion server URL 'J100.' Incidentally, the conversion server 100 for JPEG is unable to acquire a JPEG file from the data storage server without via the multi-function peripheral 10. Thus, when the JPEG file data conversion is necessary, the multi-function peripheral 10 is required to acquire a JPEG file from the data storage server and provide the JPEG file to the conversion server 100 for JPEG. Therefore, the 'progressive JPEG' is associated with 'data acquisition→conversion instruction' as the conversion method.

Further, the multi-function peripheral 10 is unable to interpret a GIF file having the internal format 'interlace GIF.' Therefore, the 'interlace GIF' is associated with 'necessary' as the conversion necessity and the conversion server URL 'G102.' Incidentally, the conversion server 102 for GIF can acquire a GIF file from the data storage server without via the multi-function peripheral 10. That is, the conversion server 102 for GIF functions not only as a conversion server of a GIF file but also as a downloader of a GIF file. Hence, the 'interlace GIF' is associated with 'conversion instruction' as the conversion method.

The vendor of the multi-function peripheral 10 investigates in advance types and internal formats of files that the respective data storage servers 40, 42, 44 can store. Based on a result of the investigation, the vendor generates the internal format table 76 and stores the internal format table 76 in the memory 74 of the relay server 60. Further, the vendor already knows the information (e.g., the conversion method and URL) relating to the conversion servers 100, 102 that are provided by the vendor. Hence, the vendor generates the conversion information table 78, based on the information relating to the conversion servers 100, 102, and stores the table 78 in the memory 74 of the relay server 60.

Incidentally, the respective data storage servers 40, 42, 44 can further store a PDF file. However, the information relating to a PDF file is not described in the respective tables 76, 78. This is because a program for enabling the conversion server 104 for PDF to execute the data conversion when a PDF file is to be output (displayed or printed) is stored in advance in the memory 24 of the multi-function peripheral 10, which will be specifically described later. That is, since the relay server 60 does not have to determine whether it is necessary to perform the data conversion for a PDF file, the information relating to a PDF file is not described in the respective tables 76, 78.

(Case A: FIG. 5)

The user of the multi-function peripheral 10 uploads in advance one or more files into at least one data storage server of the plurality of data storage servers 40, 42, 44 by using the communication device (for example, the multi-function peripheral 10, a PC, a mobile terminal and the like). In a case A of FIG. 5, the user uploads in advance one or more JPEG files into the data storage server 40. In this case, the data storage server 40 stores one or more JPEG files for display and one or more JPEG files for print by using the internal format 'baseline JPEG' (refer to FIG. 2).

The control unit 20 of the multi-function peripheral 10 displays a main screen, which is stored in advance in the memory 24 of the multi-function peripheral 10, on the display unit 14. The main screen includes a plurality of character strings (for example, 'Internet', 'Copy', 'FAX' and the like) indicating a plurality of functions that is to be selected by a user. When the user wants to receive a download service from any one of the data storage servers 40, 42, 44, the user selects the character string 'Internet' that is included in the main screen. In this case, as shown in FIG. 5, the control unit 20 of the multi-function peripheral 10 transmits a request R2 to the relay server 60.

When the request R2 is received from the multi-function peripheral 10, the control unit 70 of the relay server 60 transmits a server list, which is stored in advance in the memory 74 of the relay server 60, to the multi-function peripheral 10. The server list includes the server names 'SE40', 'SE42' and 'SE44' of the respective data storage servers 40, 42, 44.

When the server list is received from the relay server 60, the control unit 20 of the multi-function peripheral 10 displays the server list on the display unit 14. The user operates the operation unit 12 to select a server name of a data storage server, from which the multi-function peripheral 10 is to receive a download service, from the server list. In the case A of FIG. 5, the user selects the server name 'SE40' (e.g., the server name of the data storage server 40). In this case, the control unit 20 of the multi-function peripheral 10 transmits the server name 'SE40' to the relay server 60.

A first acquisition unit 90 of the relay server 60 receives the server name 'SE40' from the multi-function peripheral 10 to thus acquire the server name 'SE40.' In this case, the control unit 70 of the relay server 60 transmits a request R4 to the data storage server 40.

When the request R4 is received from the relay server 60, the data storage server 40 transmits URLs (hereinafter, simply referred to as 'display file URL') of one or more JPEG files for display that have been uploaded by the user of the multi-function peripheral 10 and file type information indicating the respective file types 'JPEG' of the one or more JPEG files for display to the relay server 60. Incidentally, in the below, the term "one or more" will be omitted unless it is explanatorily necessary.

A second acquisition unit 92 of the relay server 60 receives the display file URLs and the file type information from the data storage server 40 to thus acquire the display file URLs and the file type information. In this case, a determination unit 94 of the relay server 60 refers to the respective tables 76, 78, based on the server name 'SE40' acquired by the first acquisition unit 90, the file type information 'JPEG' acquired by the second acquisition unit 92 and a fact that the JPEG file for display is used to display a thumbnail, and thus determines whether the JPEG file for display has a format that can be interpreted by the multi-function peripheral 10 (e.g., whether it is required to perform the data conversion for the JPEG file for display).

Incidentally, in this exemplary embodiment, the determination unit 94 executes the determination based on the file type information acquired from the relay server 60. In other words, the determination unit 94 does not execute the determination based on the display file URL. This is because a there may be a case where a file extension (for example, '.jpg') is not described in the display file URL. Therefore, even when the file extension is not indicated in the display file URL, the determination unit 94 can appropriately execute the determination.

First, the determination unit 94 refers to the internal format table 76 to thus specify the 'baseline JPEG' associated with 'SE40', 'JPEG' and 'thumbnail display.' Then, the determination unit 94 refers to the conversion information table 78 to thus specify 'unnecessary' associated with the specified 'baseline JPEG.' Thereby, the determination unit 94 determines that the JPEG file for display has a format that can be interpreted by the multi-function peripheral 10 (e.g., that it is not necessary to perform the data conversion for the JPEG file for display).

As described above, in this exemplary embodiment, the tables 76, 78 are stored in advance in the relay server 60, and the relay server 60 refers to the tables 76, 78 to thus execute the above determination. Instead of this, when the tables 76, 78 are stored in advance in the multi-function peripheral 10, the control unit 20 of the multi-function peripheral 10 may execute the above determination. However, according to this configuration, if the types of the data storage servers or file types are increased or the specifications of the data storage servers 40, 42, 44 are changed (for example, a change in the file internal format with which the data storage servers 40, 42, 44 store data), it is necessary to re-record the tables 76, 78 of the multi-function peripheral 10. That is, when the above events occur, the vendor of the multi-function peripheral 10 is required to re-record the tables in all multi-function peripherals that are the same type as the multi-function peripheral 10. Compared to this, according to this exemplary embodiment, even when the above events occur, it has only to re-record the tables 76, 78 in the relay server 60 without making a change to the multi-function peripheral 10. That is, according to this exemplary embodiment, it is possible to easily cope with the above events.

When the determination unit 94 determines that the data conversion is not necessary, an output processing execution unit 98 of the relay server 60 transmits the display file URL and file type information acquired by the second acquisition unit 92 to the multi-function peripheral 10. In this case, the output processing execution unit 98 does not transmit the information indicating the conversion method, the URL of the conversion server and the like to the multi-function peripheral 10.

The control unit 20 of the multi-function peripheral 10 receives the display file URL and file type information from the relay server 60. In this case, the control unit 20 does not receive the information indicating the conversion method and the URL of the conversion server from the relay server 60. In this case, the control unit 20 transmits an acquisition request for a file for display, which is stored at a location specified by the display file URL, to the data storage server 40 without via the relay server 60, based on the display file URL. Incidentally, the acquisition request for a file for display includes the display file URL.

When the acquisition request for a file for display is received from the multi-function peripheral 10, the data storage server 40 transmits the JPEG file for display, which is stored at the location specified by the display file URL, to the multi-function peripheral 10 without via the relay server 60.

When the JPEG file for display is received (e.g., downloaded) from the data storage server 40, the control unit 20 of the multi-function peripheral 10 displays an image (e.g., thumbnail) expressed by the JPEG file for display on the display unit 14. Thereby, one or more thumbnails are displayed on the display unit 14. That is, in the case A of FIG. 5, the control unit 20 of the multi-function peripheral 10 can display one or more thumbnails on the display unit 14 even though the conversion servers 100, 102, 104 are not enabled to execute the data conversion. The user operates the operation unit 12 to thus select, from the one or more thumbnails, a target thumbnail expressing an image that is to be printed by the multi-function peripheral 10. When the user selects a target thumbnail, the control unit 20 of the multi-function peripheral 10 transmits a selection command to the relay server 60. Incidentally, the selection command includes an image ID corresponding to the target thumbnail.

When the selection command is received from the multi-function peripheral 10, the control unit 70 of the relay server 60 transmits a request R6 to the data storage server 40. The request R6 includes the same image ID as the image ID included in the selection command.

When the request R6 is received from the relay server 60, the data storage server 40 transmits a URL (hereinafter, simply referred to as 'print file URL') of a JPEG file for print (e.g., JPEG file for print corresponding to the target thumbnail) corresponding to the image ID included in the request R6 and file type information indicating a file type 'JPEG' of the JPEG file for print to the relay server 60.

The second acquisition unit 92 of the relay server 60 receives the print file URL and file type information from the data storage server 40 to thus acquire the print file URL and file type information. In this case, the determination unit 94 of the relay server 60 refers to the respective tables 76, 78, based on the acquired server name 'SE40', the acquired file type information 'JPEG' and a fact that the JPEG file for print is used for print, and thus determines whether the JPEG file for print has a format that can be interpreted by the multi-function peripheral 10 (e.g., whether it is required to perform the data conversion for the JPEG file for print).

The specific determination method is the same as the determination for the JPEG file for display. Therefore, the determination unit 94 determines that the JPEG file for print has a format that can be interpreted by the multi-function peripheral 10 (e.g., that it is not necessary to perform the data conversion for the JPEG file for print). In this case, the output processing execution unit 98 of the relay server 60 transmits the acquired print file URL and the acquired file type information to the multi-function peripheral 10. At this time, the output processing execution unit 98 does not transmit the information indicating the conversion method, the URL of the conversion server and the like to the multi-function peripheral 10.

The control unit 20 of the multi-function peripheral 10 receives the print file URL and file type information from the relay server 60. At this time, the control unit 20 does not receive the information indicating the conversion method and the URL of the conversion server from the relay server 60. In this case, the control unit 20 transmits an acquisition request for a file for print, which is stored at a location specified by the print file URL, to the data storage server 40 without via the relay server 60, based on the print file URL. Incidentally, the acquisition request for a file for print includes the print file URL.

When the acquisition request for a file for print is received from the multi-function peripheral 10, the data storage server 40 transmits the JPEG file for print, which is stored at the location specified by the print file URL, to the multi-function peripheral 10 without via the relay server 60.

When the JPEG file for print is received (e.g., downloaded) from the data storage server 40, the control unit 20 of the multi-function peripheral 10 enables the print unit 18 to print an image expressed by the JPEG file for print. Thereby, the user can acquire a printed printing sheet.

(Case B: FIG. 6)

In a case B of FIG. 6, the user uploads in advance a JPEG file into the data storage server 42. In this case, the data storage server 42 stores therein a JPEG file for display and a JPEG file for print by using the internal format 'progressive JPEG' (refer to FIG. 2).

In the case B of FIG. 6, the request R2 and the server list are transmitted and received between the multi-function peripheral 10 and the relay server 60, like the case A of FIG. 5, although the communication is not shown. The user selects the server name 'SE42' (e.g., the server name of the data storage server 42) from the server list. In this case, the control unit 20 of the multi-function peripheral 10 transmits the server name 'SE42' to the relay server 60.

The first acquisition unit 90 of the relay server 60 acquires the server name 'SE42' from the multi-function peripheral 10. In this case, the control unit 70 of the relay server 60 transmits a request R4 to the data storage server 42. Thereby, like the case A of FIG. 5, the second acquisition unit 92 of the relay server 60 acquires the display file URL and file type information 'JPEG' from the data storage server 42.

Then, the determination unit 94 of the relay server 60 refers to the respective tables 76, 78 to thus determine whether the data conversion is necessary. The determination unit 94 specifies the 'progressive JPEG' associated with 'SE42', 'JPEG' and 'thumbnail display' by referring to the internal format table 76. Then, the determination unit 94 refers to the conversion information table 78 to thus specify 'necessary' associated with the specified 'progressive JPEG.' Thereby, the determination unit 94 determines that the JPEG file for display does not have a format that can be interpreted by the multi-function peripheral 10 (e.g., that it is necessary to perform the data conversion for the JPEG file for display).

Subsequently, a conversion processing execution unit 96 of the relay server 60 refers to the conversion information table 78 to thus specify the conversion method 'data acquisition→conversion instruction' associated with the 'progressive JPEG' and the conversion server URL 'J100' associated with the 'progressive JPEG.' Then, the conversion processing execution unit 96 transmits the display file URL, the file type information 'JPEG', the conversion method 'data acquisition→conversion instruction' and the conversion server URL 'J100' to the multi-function peripheral 10.

The control unit 20 of the multi-function peripheral 10 receives the respective information from the relay server 60. In this case, since the conversion method and the conversion server URL are acquired, the control unit 20 can know that it is necessary to enable the conversion server 100 for JPEG to execute the data conversion. Specifically, since the conversion method indicates 'data acquisition→conversion instruction', the control unit 20 can know that the multi-function peripheral 10 is required to acquire a JPEG file for display from the data storage server 42. In this case, the control unit 20 transmits an acquisition request for a file for display, which is stored at a location specified by the display file URL, to the data storage server 42 without via the relay server 60, based on the display file URL. As a result, the control unit 20 receives (e.g., downloads) a JPEG file for display from the data storage server 42. Then, the control unit 20 transmits a conversion instruction including the JPEG file for display to the conversion server 100 for JPEG, based on the conversion server URL 'J100.'

When the conversion instruction is received from the multi-function peripheral 10, the conversion server 100 for JPEG converts the JPEG file for display included in the conversion instruction. Specifically, the conversion server 100 for JPEG generates a converted file having the target format (e.g., format that can be interpreted by the multi-function peripheral 10) from the JPEG file for display having the internal format 'progressive JPEG.' The conversion server 100 for JPEG transmits the converted file to the multi-function peripheral 10.

When the converted file is received from the conversion server 100 for JPEG, the control unit 20 of the multi-function peripheral 10 displays an image (e.g., thumbnail) expressed by the converted file on the display unit 14. Thereby, one or more thumbnails are displayed on the display unit 14. When the user selects a target thumbnail, the control unit 20 of the multi-function peripheral 10 transmits a selection command to the relay server 60. Incidentally, the processing thereafter is the same as the above respective processing, except that the file for print is used instead of the file for display.

(Case C: FIG. 7)

In a case C of FIG. 7, the user uploads in advance a GIF file into the data storage server 42. In this case, the data storage server 42 stores therein a GIF file for display and a GIF file for print by using the internal format 'interlace GIF' (refer to FIG. 2).

The respective processing of the case C of FIG. 7 is basically the same as that of the case B of FIG. 6. However, the determination unit 94 of the relay server 60 refers to the internal format table 76 and the conversion information table 78, based on 'SE42', 'GIF' and thumbnail display', and thus determines that the data conversion is necessary. In this case, the conversion processing execution unit 96 of the relay server 60 transmits the display file URL, the file type information 'GIF', the conversion method 'conversion instruction' and the conversion server URL 'G102' to the multi-function peripheral 10.

Since the conversion method indicates 'conversion instruction', the control unit 20 of the multi-function peripheral 10 can know that the conversion server 102 for GIF can acquire a GIF file for display from the data storage server 41 without via the multi-function peripheral 10 (that is, that it is not necessary for the multi-function peripheral 10 to acquire a GIF file for display from the data storage server 42). In this case, the control unit 20 transmits a conversion instruction including a display file URL to the conversion server 102 for GIF, based on the conversion server URL 'G102.'

When the conversion instruction is received from the multi-function peripheral 10, the conversion server 102 for GIF transmits an acquisition request for a file for display, which is stored at a location specified by the display file URL, to the data storage server 42, based on the display file URL included in the conversion instruction. Thereby, the conversion server 102 for GIF acquires a GIF file for display from the data storage server 42 without via the multi-function peripheral 10. Then, the conversion server 102 for GIF generates a converted file having the target format from the GIF file for display having the internal format 'interlace GIF.' The conversion server 102 for GIF transmits the converted file to the multi-function peripheral 10. As a result, one or more thumbnails are displayed on the multi-function peripheral 10. Incidentally, the processing thereafter is the same as the above respective processing, except that the file for print is used instead of the file for display.

Incidentally, although a sequence diagram is not shown, the data storage server 44 stores therein a JPEG file for display having the internal format 'progressive JPEG' and a JPEG file for print having the internal format 'baseline JPEG.' In this case, the relay server 60 determines that it is necessary to perform the data conversion for the JPEG file for display stored in the data storage server 44. Therefore, likewise the case B of FIG. 6, the multi-function peripheral 10 enables the conversion server 100 for JPEG to perform the data conversion for the JPEG file for display. On the other hand, the relay server 60 determines that it is not necessary to perform the data conversion for the JPEG file for print stored in the data storage server 44. Therefore, likewise the case A of FIG. 5, the multi-function peripheral 10 does not enable the conversion server 100 for JPEG to perform the data conversion for the JPEG file for print.

Figure 8:
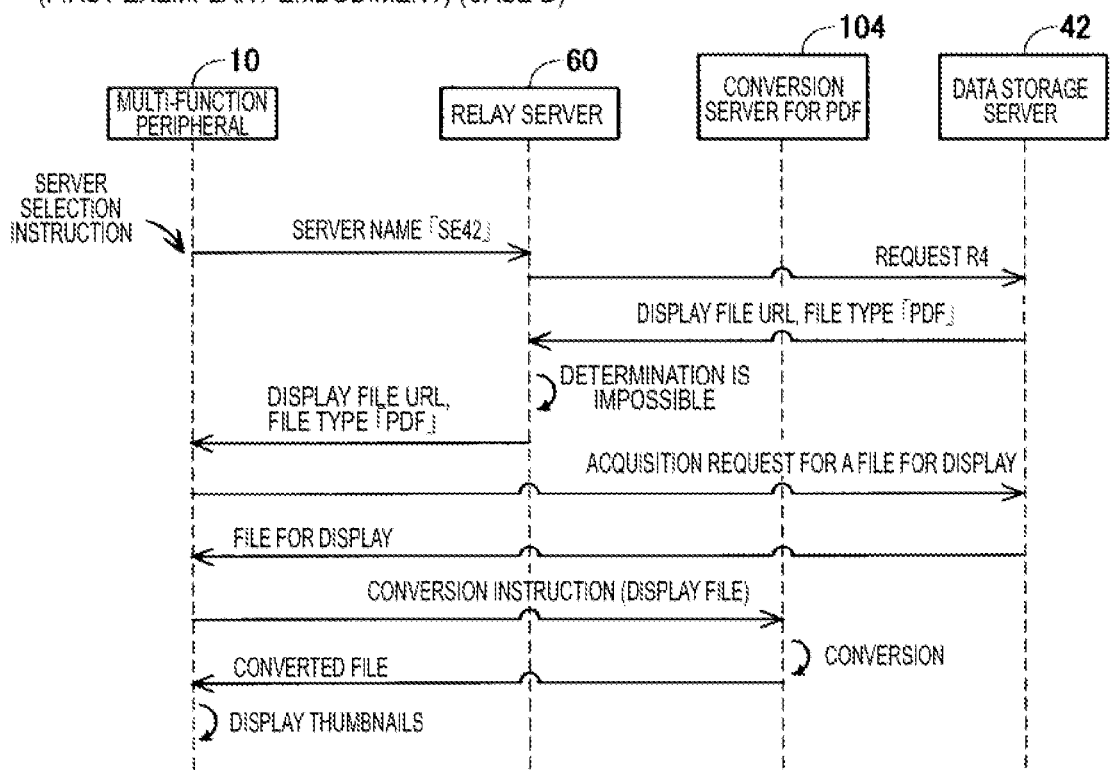
FIG. 8 shows a sequence diagram of a case D where it is not possible to determine whether data conversion is necessary.

(Case D: FIG. 8)

In a case D of FIG. 8, the user uploads in advance a PDF file into the data storage server 42. In this case, the data storage server 42 stores therein a PDF file for display and a PDF file for print. At this time, the data storage server 42 may store a PDF file having any internal format.

The respective processing of the case D of FIG. 8 is basically the same as that of the cases A to C of FIGS. 5 to 7. Incidentally, the information about the PDF file is not described in the internal format table 76 and the conversion information table 78f. Thus, the determination unit 94 of the relay server 60 is unable to determine whether the data conversion is necessary. In this case, the control unit 70 of the relay server 60 transmits a display file URL and file type information 'PDF' to the multi-function peripheral 10. At this time, the control unit 70 does not transmit the conversion method and the conversion server URL to the multi-function peripheral 10. Hence, likewise the case A of FIG. 5, the control unit 70 transmits only the display file URL and file type information to the multi-function peripheral 10.

The URL 'P104' of the conversion server 104 for PDF is stored in advance in the memory 24 of the multi-function peripheral 10. When the file type information indicates 'PDF,' a program for enabling the multi-function peripheral 10 to acquire a PDF file from the data storage server 42 and to transmit a conversion instruction including the PDF file to the conversion server 104 for PDF is further stored in advance in the memory 24. Hence, when the display file URL and the file type information 'PDF' are received from the relay server 60, the control unit 20 of the multi-function peripheral 10 transmits an acquisition request for a file for display to the data storage server 42, based on the display file URL, and acquires a PDF file for display from the data storage server 42.

Subsequently, the control unit 20 sets the conversion server URL 'P104', which is stored in advance in the memory 24, as a transmission destination and transmits a conversion instruction including the PDF file for display to the conversion server 104 for PDF. As a result, the conversion server 104 for PDF generates a converted file having the target format from the PDF file for display. The conversion server 104 for PDF transmits the converted file to the multi-function peripheral 10. As a result, one or more thumbnails are displayed on the multi-function peripheral 10. Incidentally, the processing thereafter is the same as the above respective processing, except that the file for print is used instead of the file for display.

(Advantages of First Exemplary Embodiment)

The internal format of the file that is stored in the data storage servers 40, 42, 43 depends on the data storage servers 40, 42, 44. For example, the data storage server 40 stores therein the JPEG file having the internal format 'baseline JPEG' that can be interpreted by the multi-function peripheral 10. On the other hand, for example, the data storage server 42 stores therein the JPEG file having the internal format 'progressive JPEG' that is unable to be interpreted by the multi-function peripheral 10. The relay server 60 is unable to perceive the type of the internal format when only referring to the file type information 'JPEG' acquired from the data storage servers 40, 42. As a result, it is not possible to appropriately determine whether the data conversion is necessary. Therefore, in this exemplary embodiment, the vendor of the multi-function peripheral 10 stores the tables 76, 78 in advance in the memory 74 of the relay server 60. Thereby, the relay server 60 can appropriately determine whether the data conversion is necessary by referring to the tables 76, 78, based on the server name and file type information.

Further, the data storage server 44 stores therein the JPEG file for display having the internal format 'progressive JPEG' that is unable to be interpreted by the multi-function peripheral 10 and the JPEG file for print having the internal format 'baseline JPEG' that can be interpreted by the multi-function peripheral 10. That is, the data storage server 44 stores the JPEG file having a different internal format, depending on the output method (e.g., display or print) of the file. Thus, in this exemplary embodiment, the information about the output method is also described in the internal format table 76. Thereby, the relay server 60 can determine whether the data conversion is necessary, more appropriately, based on the output method.

When it is determined that the data conversion is not necessary, the relay server 60 (e.g., the output processing execution unit 98) transmits the file URL and the file type information to the multi-function peripheral 10 without transmitting the conversion method and the conversion server URL to the multi-function peripheral 10, as shown in the case A of FIG. 5. Thereby, the multi-function peripheral 10 executes the thumbnail display and the image print without enabling the conversion servers 100, 102, 104 to execute the data conversion. On the other hand, when it is determined that the data conversion is necessary, the relay server 60 (e.g., the conversion processing execution unit 98) transmits the conversion method and the conversion server URL to the multi-function peripheral 10, as shown in the case B of FIG. 6. Thereby, the multi-function peripheral 10 enables the conversion server 100 for JPEG to execute the data conversion and executes the thumbnail display and the image print. That is, the multi-function peripheral 10 can appropriately execute the image output because the relay server 60 can execute the appropriate processing, depending on the determination result.

Further, the relay server 60 transmits the conversion method to the multi-function peripheral 10. Thus, by referring to the conversion method, the multi-function peripheral 10 can determine whether it is necessary for the multi-function peripheral 10 to acquire a file for display (or print) from the data storage server 40 and the like. For example, in the case B of FIG. 6, the multi-function peripheral 10 can acquire a file from the data storage server 42 and transmit a conversion instruction including the file to the conversion server 100 for JPEG. Further, in the case C of FIG. 7, the multi-function peripheral 10 can supply a conversion instruction not including a file (e.g., a conversion instruction including a file URL) to the conversion server 102 for GIF without acquiring a file from the data storage server 42. As a result, the conversion server 102 for GIF can acquire a file from the data storage server 42 without via the multi-function peripheral 10. According to this exemplary embodiment, since the relay server 60 transmits the conversion method to the multi-function peripheral 10, the multi-function peripheral 10 can execute the appropriate processing in accordance with the conversion method.

Incidentally, the multi-function peripheral 10 and the relay server 60 are examples of the 'image output apparatus' and the 'control device', respectively. In the case A of FIG. 5, the data storage server 40, the server name 'SE40' and the file type information 'JPEG' are examples of the 'specific data storage server', the 'specific server identification information' and the 'specific file type information', respectively. Further, in the case B of FIG. 6, the data storage server 42, the server name 'SE42', the file type information 'JPEG', the conversion server 100 for JPEG and the conversion server URL 'J100' are examples of the 'specific data storage server', the 'specific server identification information', the 'specific file type information', the 'specific conversion server' and the 'specific location information', respectively. In the case A of FIG. 5, the processing of transmitting the display file URL (or print file URL) and the file type 'JPEG' to the multi-function peripheral 10 is an example of the 'output processing.' Further, in the case B of FIG. 6 (or the case C of FIG. 7), the processing of transmitting the display file URL (or print file URL), the file type 'JPEG' (or 'GIF'), the conversion method and the conversion server URL to the multi-function peripheral 10 is an example of the 'conversion processing.' In the cases B and C of FIGS. 6, and 7, the conversion method that is transmitted from the relay server 60 to the multi-function peripheral 10 is an example of the 'method relation information.' A combination of the tables 76, 78 of FIGS. 2 and 3 is an example of the 'format relation information table.' Further, the 'conversion necessity' of the 'conversion information table 78' is an example of the 'format relation information.'

(Second Exemplary Embodiment)

In a second exemplary embodiment, the conversion method and the conversion server URL are not described in the conversion information table 78. (refer to FIG. 3). Further, the URL table 26 is stored in advance in the memory 24 of the multi-function peripheral 10. As shown in FIG. 4, the URL table 26 is a table in which a file type, a conversion method and a conversion server URL are associated with one another.

Figure 9:
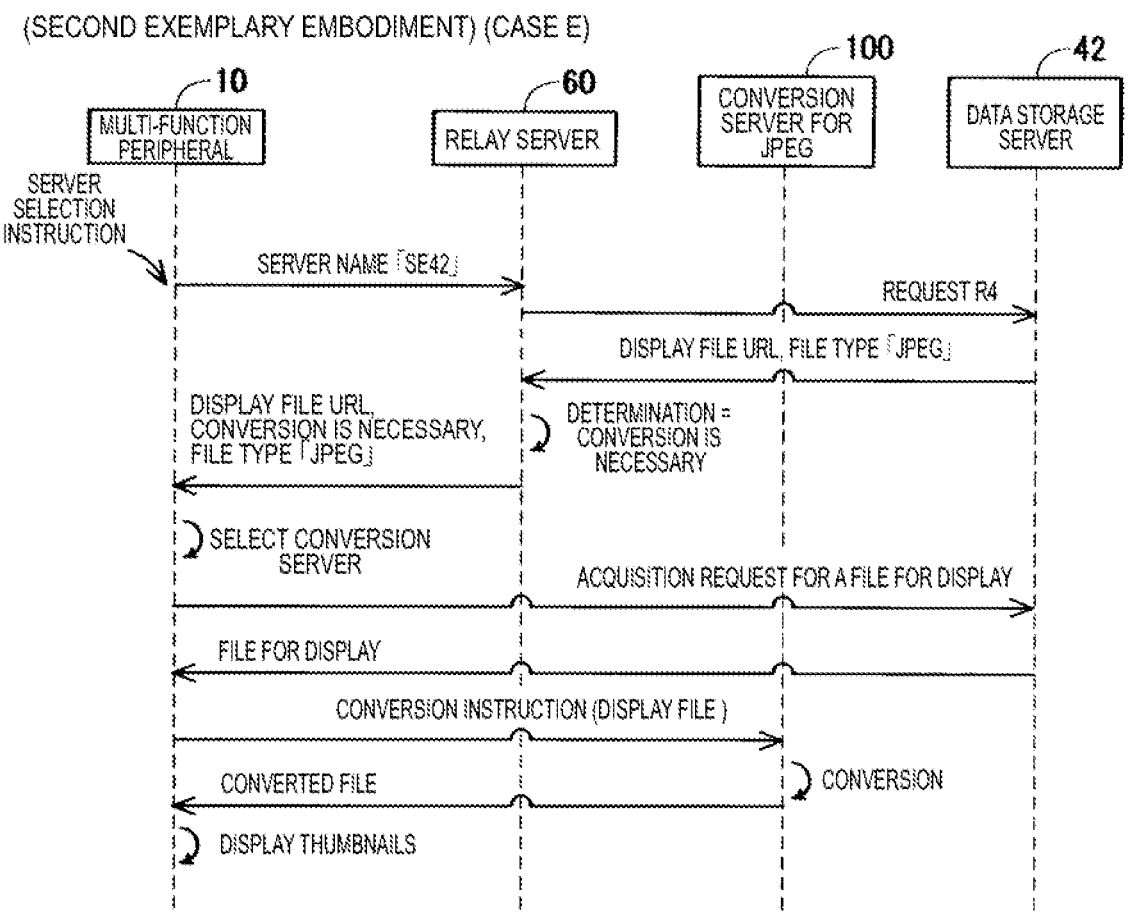
FIG. 9 shows a sequence diagram of a case E of a second exemplary embodiment where data conversion is necessary.

(Case E: FIG. 9)

In a case E of FIG. 9, the user uploads a JPEG file into the data storage server 42. The respective processing of the case E of FIG. 9 is basically the same as that of the case B of FIG. 6. However, when it is determined that the data conversion is necessary, the conversion processing execution unit 96 of the relay server 60 transmits the display file URL, the file type information 'JPEG' and the information ('conversion necessity' of FIG. 9: which is hereinafter referred to as 'conversion necessity information') indicating that the data conversion is necessary to the multi-function peripheral 10. Contrary to the case B of FIG. 6, the conversion processing execution unit 96 does not transmit the conversion method and conversion server URL to the multi-function peripheral 10.

The control unit 20 of the multi-function peripheral 10 receives the conversion necessity information from the relay server 60 to thus perceive that the data conversion is necessary. In this case, the control unit 20 refers to the URL table 26 of FIG. 4, based on the file type information 'JPEG', and thus specifies the conversion method 'data acquisition→conversion instruction' and the conversion server URL 'J100.' Thereby, the conversion server 100 for JPEG which is to execute the data conversion is selected. The processing thereafter is the same as the case B of FIG. 6. Also in the second exemplary embodiment, it is possible to obtain the same effects as those of the first exemplary embodiment. Incidentally, the URL table 26 of FIG. 4 is an example of the 'location information table.'

<Modifications to Exemplary Embodiments>

Although the specific embodiments of the invention have been specifically described, the embodiments are just exemplary and do not limit the claims. The technology defined in the claims includes a variety of modification and changes to the above embodiments. For example, following modified exemplary embodiments are included.

(First Modified Exemplary Embodiment)

In the above respective exemplary embodiments, while the data storage servers 40, 42 do not change the internal format between the file for display and the file for print, the data storage server 44 changes the internal format between the file for display and the file for print. When a situation where the latter data storage server is not provided is assumed, the output method may not be described in the internal format table 76 (refer to FIG. 2). Generally, the determination unit may perform the determination, based on the specific server identification information and the specific file type information.

(Second Modified Exemplary Embodiment)

In the above-described exemplary embodiments, while the conversion servers 100, 104 are unable to acquire the file from the data storage server 40 and the like without via the multi-function peripheral 10, the conversion server 102 can acquire the file from the data storage server 40 and the like without via the multi-function peripheral 10. When a situation where only the former conversion server or only the latter conversion server is provided is assumed, the conversion method may not be described in the conversion information table 78 (refer to FIG. 3). That is, the conversion processing execution unit 96 may not transmit the conversion method to the multi-function peripheral 10. Generally, the conversion processing execution unit may execute the conversion processing (for example, the transmission of at least the conversion server URL in the first exemplary embodiment, and the transmission of at least the conversion necessity information in the second exemplary embodiment).

(Third Modified Exemplary Embodiment)

The internal format table 76 (refer to FIG. 2) and the conversion information table 78 (refer to FIG. 3) may not be divided the two tables and may be integrated into one table. In this case, the one table may be a table in which at least the server name, the file type and the conversion necessity are associated with one another. Even with this configuration, the determination unit 94 can determine whether the data conversion is necessary or not. In this modified exemplary embodiment, the conversion necessity is an example of the 'format relation information.' Incidentally, in another modified exemplary embodiment, the one table may be a table in which at least the server name, the file type and the conversion server URL are associated with one another. In this case, the determination unit 94 may determine that the data conversion is necessary when the data indicating the conversion server URL is described in association with the server name and the file type information, and may determine that the data conversion is not necessary when the data indicating the conversion server URL is not described in association with the server name and file type information. In this modified exemplary embodiment, the conversion server URL is an example of the 'format relation information.'

(Fourth Modified Exemplary Embodiment)

In the above-described exemplary embodiments, the determination unit 94 determines whether the data conversion is necessary, based on the file type information that is independently acquired from the display (or print) file URL from the relay server 60. Alternatively, the determination unit 94 may determine whether the display (or print) file URL indicates a file extension, and when it is determined that the display (or print) file URL indicates a file extension, the determination unit 94 may determine whether the data conversion is necessary, based on the file extension. In this case, the display (or print) file URL is an example of the 'specific file type information.'

(Fifth Modified Exemplary Embodiment)

The 'specific server identification information' may not be a server name and may be an ID for identifying a server, a name of service that is provided by the server, an IP address of the server, a MAC address of the server, and the like. Generally, the 'specific server identification information' may be information for identifying a specific data storage server.

(Sixth Modified Exemplary Embodiment)

The 'method relation information' may not be the information (for example, 'data acquisition→conversion instruction') indicating the conversion method, and a flag '1' may be adopted as the information indicating the 'first method' and a flag '0' may be adopted as the information indicating the 'second method.' Generally, the method relation information may be information relating to any one of the first and second methods.

(Seventh Modified Exemplary Embodiment)

The 'image output apparatus' may not be the multi-function peripheral and may be a printer, a FAX apparatus, a telephone apparatus, a PC, a mobile terminal and the like. Further, the 'image output apparatus' may not have both the display unit and the print unit and may have only one of the display unit and the print unit. Generally, the 'image output apparatus' may be an apparatus that outputs (displays or prints) an image.

(Eighth Modified Exemplary Embodiment)

In the above-described exemplary embodiments, the relay server 60 is provided. However, a system in which the relay server 60 is not provided may be configured. In this case, the tables 76, 78 may be stored in advance in the memory 24 of the multi-function peripheral 10. Further, the functions of the respective units 90 to 98 may be implemented by the control unit 20 of the multi-function peripheral 10. In this modified exemplary embodiment, the control unit 20 of the multi-function peripheral 10 is an example of the 'control device.'

(Ninth Modified Exemplary Embodiment)

In the above-described exemplary embodiments, the CPU 72 of the relay server 60 executes the processing in response to the software so as to implement the functions of the respective units 90 to 98. Alternatively, at least a part of the functions of the respective units 90 to 98 may be implemented by hardware such as, logical circuit.

Further, the technical elements illustrated in the specification or drawings exhibit the technical availability individually or by a variety of combinations thereof and are not limited to the combinations defined in the claims at the time of filing the application. Further, the technology exemplified in the specification or drawings achieves a plurality of purposes at the same time and the achievement of any one purpose has the technical availability.

What is claimed is:

1. A control device for an image output apparatus that is configured to output an image, the control device comprising:
a communication interface configured to communicate with the image output apparatus, a plurality of data storage servers, and a conversion server, the plurality of data storage servers including a first server and a second server, the first server storing data of a first file type in a first special file type and the second server storing data of the first file type in a first normal file type;

a processor; and memory storing computer-readable instructions, when executed by the processor, causing the control device to:

when a specific data storage server from a plurality of data storage servers is selected by a user, acquire specific server identification information for identifying the specific data storage server;

when the specific server identification information is acquired, acquire specific file type information indicating a file type of specific data, which is stored in the specific data storage server, from the specific data storage server;

determine whether the specific data has an interpretable format that can be interpreted by the image output apparatus, based on the specific server identification information and the specific file type information, wherein the interpretable format includes the first normal file type and excludes the first special file type;

when it is determined that the specific data storage server corresponds to the second server and the specific data does not have the interpretable format, execute conversion processing for causing the conversion server to execute data conversion processing of converting the specific data to converted data, the converted data having the interpretable format;

execute output processing for causing the image output apparatus to output a specific image that is expressed by the specific data without causing the specific conversion server to execute the data conversion processing when it is determined that the specific data has the interpretable format;

in a case that the specific server identification information indicates the first server and the specific data is indicating the first file type, determining that the specific data does not have an interpretable format that can be interpreted by the image output apparatus; and in a case that the specific server identification information indicates the second server and the specific file type information indicating the first file type, determining that the specific data has an interpretable format that can be interpreted by the image output apparatus;

wherein the memory is configured to store a format relation information table, in which server identification information, a file type and format relation information are associated with one another, the format relation information being information relating to whether data having the file type, which is stored in the data storage server identified by the server identification information, has the interpretable format, and wherein in determining whether the specific data has an interpretable format that can be interpreted by the image output apparatus, it is determined by referring to the format relation information table and to determine whether the specific data has the interpretable format based on the specific server identification information and the specific file type information.

2. The control device according to claim 1, wherein the image output apparatus comprises:
   a display unit configured to display an image; and
   a print unit configured to print an image, and wherein in determining whether the specific data has an interpretable format that can be interpreted by the image output apparatus, it is determined further based on whether the specific data is data that is to be displayed by the display unit or whether the specific data is data that is to be printed by the print unit.

3. The control device according to claim 2, wherein the third server stores data for a thumbnail image in the first special file type and stores data for a printing image in the first normal file type, wherein when the specific server identification information is acquired indicating the third server, it is determined that the specific data does not have an interpretable format that can be interpreted by the image output apparatus if the specific data is to be displayed by the display unit, and that the specific data has an interpretable format that can be interpreted by the image output apparatus if the specific data is to be printed by the print unit.

4. The control device according to claim 1, wherein the control device is a control server configured to communicate with the image output apparatus via a network through the communication interface, and wherein the conversion processing comprises transmitting specific location information, which indicates a location of the specific conversion server on the network, to the image output apparatus.

5. The control device according to claim 1, wherein the conversion processing is executed such that the specific conversion server acquires the specific data from the specific data storage server without via the image output apparatus and executes the data conversion processing of converting the acquired specific data to the converted data.

6. The control device according to claim 1, wherein the conversion processing is executed such that the image output apparatus acquires the specific data from the specific data storage server and supplies the specific data to the conversion server.

7. The control device according to claim 1, wherein the control device is a control server configured to communicate with the image output apparatus via a network through the communication interface, wherein the conversion processing comprises transmitting method relation information to the image output apparatus, and wherein the method relation information is information relating to any one of:
   a first method where the specific conversion server acquires the specific data from the specific data storage server without via the image output apparatus; and
   a second method where the image output apparatus acquires the specific data from the specific data storage server and supplies the specific data to the conversion server.

8. The control device according to claim 1, wherein the control device is a control server configured to communicate with the image output apparatus via a network through the communication interface, wherein the computer-readable program, when executed by the processor, causes the control device to store a location information table in which a file type and location information indicating a location of a conversion server executing conversion of data having the file type on the network are associated with one another, and wherein the conversion processing comprises transmitting information indicating that the data conversion processing is necessary and the specific file type information to the image output apparatus such that the image output apparatus causes the specific conversion server to execute the data conversion processing by using specific location information associated with the specific file type information in the location information table.

9. The control device according to claim 1, wherein when it is determined that the specific data does not have the interpretable format, the conversion processing is executed for causing the specific conversion server to execute the data conversion processing of converting the specific data to the converted data, and the output processing is executed for causing the image output apparatus to output the specific image on the basis of the converted data.

10. The control device according to claim 1, wherein, in a case where the specific file type information cannot be determined from the format relation information table, the conversion processing is executed.

11. A non-transitory computer-readable storage medium having a computer program stored thereon and readable by a computer of a control device for an image output apparatus configured to output an image, the computer program, when executed by the computer, causes the control device to perform operations comprising:
first acquisition processing of, when a specific data storage server from a plurality of data storage servers is selected by a user, acquiring specific server identification information for identifying the specific data storage server from among a plurality of data storage servers including a first server and a second server, the first server storing data of a first file type in a first special file type and the second server storing data of the first file type in a first normal file type;
second acquisition processing of, when the specific server identification information is acquired, acquiring specific file type information indicating a file type of specific data, which is stored in the specific data storage server, from the specific data storage server;
determination processing of determining whether the specific data has an interpretable format that can be interpreted by the image output apparatus, based on the specific server identification information and the specific file type information, wherein the interpretable format includes the first normal file type and excludes the first special file type;
conversion processing of, when it is determined that the specific data storage server corresponds to the second server and the specific data does not have the interpretable format, causing the specific conversion server to execute data conversion processing of converting the specific data to converted data, the converted data having the interpretable format;
output processing of causing the image output apparatus to output a specific image that is expressed by the specific data without causing the specific conversion server to execute the data conversion processing when it is determined that the specific data has the interpretable format;
in a case that the specific server identification information indicates the first server and the specific data is indicating the first file type, determine that the specific data does not have an interpretable format that can be interpreted by the image output apparatus; and
in a case that the specific server identification information indicates the second server and the specific file type information indicating the first file type, determine that the specific data has an interpretable format that can be interpreted by the image output apparatus;
wherein the memory is configured to store a format relation information table, in which server identification information, a file type and format relation information are associated with one another, the format relation information being information relating to whether data having the file type, which is stored in the data storage server identified by the server identification information, has the interpretable format, and
wherein in determining whether the specific data has an interpretable format that can be interpreted by the image output apparatus, it is determined by referring to the format relation information table and to determine whether the specific data has the interpretable format based on the specific server identification information and the specific file type information.

12. The non-transitory computer-readable storage medium according to claim 11, wherein, in a case where the specific file type information cannot be determined from the format relation information table, the conversion processing is executed.

13. The non-transitory computer-readable storage medium according to claim 11, wherein the third server stores data for a thumbnail image in the first special file type and stores data for a printing image in the first normal file type, wherein when the specific server identification information is acquired indicating the third server, it is determined that the specific data does not have an interpretable format that can be interpreted by the image output apparatus if the specific data is to be displayed by a display unit, and that the specific data has an interpretable format that can be interpreted by the image output apparatus if the specific data is to be printed by a print unit.

14. The non-transitory computer-readable storage medium according to claim 11, wherein the control device is a control server configured to communicate with the image output apparatus via a network, wherein the conversion processing further includes transmitting method relation information to the image output apparatus, and wherein the method relation information is information relating to any one of:
a first method where the specific conversion server acquires the specific data from the specific data storage server without via the image output apparatus; and
a second method where the image output apparatus acquires the specific data from the specific data storage server and supplies the specific data to the conversion server.

* * * * *